(12) United States Patent
Niessner et al.

(10) Patent No.: US 10,598,130 B2
(45) Date of Patent: Mar. 24, 2020

(54) SPARK PLUG WITH SUPPLY PASSAGE FOR FUEL, AND A SYSTEM WITH SAME

(71) Applicant: Federal-Mogul Ignition GmbH, Neuhaus-Schierschnitz (DE)

(72) Inventors: Werner Niessner, Steinheim (DE); Andreas Zeh, Sonneberg (DE); Matthias Blankmeister, Haan (DE)

(73) Assignee: FEDERAL-MOGUL IGNITION GMBH, Neuhaus-Schierschni (DE)

( * ) Notice: Subject to any disclaimer, the term of this patent is extended or adjusted under 35 U.S.C. 154(b) by 0 days.

(21) Appl. No.: 16/211,665

(22) Filed: Dec. 6, 2018

(65) Prior Publication Data

US 2019/0170090 A1 Jun. 6, 2019

(30) Foreign Application Priority Data

Dec. 6, 2017 (DE) .......................... 10 2017 129 056

(51) Int. Cl.
*F02M 21/00* (2006.01)
*F02M 21/02* (2006.01)
(Continued)

(52) U.S. Cl.
CPC ..... *F02M 21/0275* (2013.01); *F02B 19/1009* (2013.01); *F02B 19/12* (2013.01);
(Continued)

(58) Field of Classification Search
CPC .......... F02M 21/0275; F02M 21/0281; F02M 57/06; F02B 19/12; F02B 19/1009;
(Continued)

(56) References Cited

U.S. PATENT DOCUMENTS 2,081,503 A * 5/1937 Nowosielski ........... H01T 13/05
439/434
4,319,552 A * 3/1982 Sauer ...................... H01T 13/54
123/297
(Continued)

FOREIGN PATENT DOCUMENTS

DE 3913665 A1 10/1990
DE 102005017186 A1 10/2006
(Continued)

OTHER PUBLICATIONS

Office action issued by the German Patent and Trademark Office for application No. DE 102017129056.7.

*Primary Examiner* — Phutthiwat Wongwian
*Assistant Examiner* — Sherman D Manley
(74) *Attorney, Agent, or Firm* — Reising Ethington, P.C.

(57) ABSTRACT

A system composed of a water sleeve and a spark plug for an internal combustion engine. The spark plug has a supply passage, a center conductor, an insulator surrounding the center conductor, and a metallic body surrounding the insulator. A center electrode and at least one ground electrode form a spark air gap. In the region of its front end, the spark plug has an external thread for screwing the spark plug into a component of the internal combustion engine and has at least one discharge opening of the supply passage. The spark plug, at its front end, has attached to the body, a sleeve that contains the external thread; the body has, on its outside, at least one groove that forms a section of the supply passage; and the sleeve has a heat conducting section that contains at least a part of the external thread and that is in contact with the body and covers at least portions of the groove.

12 Claims, 4 Drawing Sheets

(51) Int. Cl.

| | |
|---|---|
| *H01T 13/54* | (2006.01) |
| *H01T 13/32* | (2006.01) |
| *F02B 19/10* | (2006.01) |
| *F02B 19/12* | (2006.01) |
| *F02M 57/06* | (2006.01) |
| *H01T 13/40* | (2006.01) |
| *H01T 13/08* | (2006.01) |

(52) U.S. Cl.
CPC ........ *F02M 21/0281* (2013.01); *F02M 57/06* (2013.01); *H01T 13/32* (2013.01); *H01T 13/40* (2013.01); *H01T 13/54* (2013.01); *H01T 13/08* (2013.01)

(58) Field of Classification Search
CPC ......... H01T 13/32; H01T 13/54; H01T 13/40; H01T 13/08
See application file for complete search history.

(56) References Cited

U.S. PATENT DOCUMENTS

| | | | | |
|---|---|---|---|---|
| 5,497,744 A | * | 3/1996 | Nagaosa | ............... F02M 51/005 |
| | | | | 123/297 |
| 5,852,993 A | * | 12/1998 | Anderson | ............... F02B 43/00 |
| | | | | 123/297 |
| 6,119,651 A | * | 9/2000 | Anderson | ............... F02B 43/00 |
| | | | | 123/297 |
| 9,217,360 B2 | * | 12/2015 | Pierz | ........................ F02B 19/12 |
| 9,617,908 B2 | * | 4/2017 | Willi | ................... F02B 19/1004 |
| 2004/0194753 A1 | | 10/2004 | Weickel | |
| 2010/0001626 A1 | * | 1/2010 | Maul | ...................... H01T 13/36 |
| | | | | 313/118 |
| 2015/0040845 A1 | | 2/2015 | Chiera et al. | |
| 2015/0211410 A1 | * | 7/2015 | Saville | ................. F02M 53/043 |
| | | | | 123/41.52 |
| 2018/0123324 A1 | * | 5/2018 | Niessner | ................. H01T 13/08 |
| 2019/0170090 A1 | * | 6/2019 | Niessner | ................. H01T 13/32 |
| 2019/0234293 A1 | * | 8/2019 | Holzhammer | ............ F01P 3/02 |
| 2019/0284985 A1 | * | 9/2019 | Perr | ......................... F01P 3/02 |

FOREIGN PATENT DOCUMENTS

| | | |
|---|---|---|
| DE | 102011012528 B3 | 5/2012 |
| DE | 102013210125 A1 | 12/2014 |
| DE | 102014214174 A1 | 1/2016 |
| EP | 3068001 A1 | 9/2016 |
| FR | 2743109 A1 | 7/1997 |
| JP | 2011222205 A | 11/2011 |
| WO | WO03071644 A1 | 8/2003 |
| WO | 2017029323 A1 | 2/2017 |

\* cited by examiner

SPARK PLUG WITH SUPPLY PASSAGE FOR FUEL, AND A SYSTEM WITH SAME

This application claims the benefit of German Application No. 10 2017 129 056.7, filed on Dec. 6, 2017, the contents of which are hereby incorporated by reference in their entirety.

FIELD

The invention relates to a spark plug having a supply passage for fuel for an internal combustion engine, in particular a pre-chamber spark plug for a gas-powered internal combustion engine, and a system with the same.

BACKGROUND

A so-called a gas-scavenged spark plug has at least one supply passage for an enrichment fuel that opens into its pre-chamber. Spark plugs of this type are frequently screwed into sleeves that are placed in a cylinder head of an internal combustion engine, in particular a stationary gas engine, and have coolant from the internal combustion engine flowing around them for the purpose of cooling, and hence are also referred to as "water sleeves." The supply of fuel to the spark plug can take place through the water sleeve. At the same time, cooling of the spark plug takes place through the water sleeve.

Today, many internal combustion engines, especially large gas engines, are intended to operate by preference in lean-burn operation. A very lean fuel/air mixture is then present in the combustion chamber of the internal combustion engine, for which mixture the ratio—lambda—of the quantity of air that is actually present in the combustion chamber to the quantity of air stoichiometrically necessary for complete combustion of the fuel is greater than 1. Very lean fuel/air mixtures are difficult to ignite.

Described in DE 10 2013 210 125 A1 is a system composed of a water sleeve and a spark plug of the initially mentioned type with a pre-chamber delimited by a cap, in which enrichment fuel is delivered to the pre-chamber as additional fuel through supply passages provided in the spark plug, so as to be able to more easily ignite the fuel/air mixture present in the pre-chamber. The fuel/air mixture ignited in the pre-chamber then shoots through openings in the cap into the combustion chamber of the internal combustion engine and reliably ignites the much leaner mixture there.

DE 10 2013 210 125 A1 describes a spark plug having a body in which is provided a very narrow, multiple angle supply passage for an enrichment fuel. For all intents and purposes, a supply passage of this nature is not manufacturable with acceptable effort. To simplify manufacturability, DE 10 2013 210 125 A1 describes additional embodiments in which a sleeve is arranged between the insulator and the enclosing body. A necessary seal between the insulator and the body can be degraded by this sleeve located within the body. Furthermore, an annular gap extending in the circumferential direction of the spark plug is provided between the sleeve and the body; this gap impairs heat dissipation from the insulator nose and the center conductor projecting therefrom to the body.

SUMMARY

An object of the present application is to provide a spark plug that is simple to produce and ensures good heat dissipation. It is an additional object to provide a system composed of spark plug and water sleeve that ensures good heat dissipation.

This object may be attained by a spark plug with the features specified in claim 1, and by a system with the features specified in claim 11. Advantageous further developments of the invention are the subject matter of the dependent claims.

The spark plug according to one embodiment has a supply passage for fuel, a center conductor, an insulator surrounding the center conductor, and a metallic body surrounding the insulator. A center electrode connected in an electrically conductive manner to the center conductor and at least one ground electrode connected in an electrically conductive manner to the body form a spark air gap. A cap can be located at the front end of the spark plug that shields the spark air gap from a combustion chamber of the internal combustion engine after the spark plug is installed in the internal combustion engine. The cap can delimit a pre-chamber in which the spark air gap is located. The cap can have at least one opening that permits gas exchange between the pre-chamber and the space outside of the pre-chamber. In the region of its front end, the spark plug has an external thread for screwing the spark plug into a component of the internal combustion engine and has at least one discharge opening of the supply passage. The spark plug can be screwed into, e.g., a cylinder head of an internal combustion engine or into a water sleeve that sits in the cylinder head and around which coolant of the internal combustion engine flows for the purpose of cooling. The spark plug has a sleeve at its front end. The sleeve is attached to the body and contains the external thread. The sleeve can contain the cap. The sleeve of the spark plug can have multiple sleeve sections. The sleeve sections can be produced as a single piece with one another or can be prefabricated in individual parts. One sleeve section can contain the external thread. Another sleeve section can contain the cap. Alternatively, the water sleeve can have the cap that delimits the pre-chamber. In this case, the sleeve of the spark plug contains no cap.

The body has, on its outside, at least one groove that forms a section of the supply passage. The groove can run with its longitudinal direction along the longitudinal direction of the spark plug. The sleeve has a heat conducting section that contains at least a part of the external thread. The heat conducting section is in contact with the body and covers at least portions of the groove. A longitudinal section of the groove is completely covered by the sleeve perpendicular to the longitudinal direction of the groove. Laterally adjacent to the groove, the sleeve is in contact with the body. A circumferential wall surrounding the supply passage is thus formed in part by the body and in part by the sleeve.

A system according to one embodiment composed of spark plug and water sleeve contains a water sleeve having an external thread for screwing the water sleeve into a cylinder head of the internal combustion engine and having an internal thread. The internal thread of the water sleeve is designed such that the external thread of the spark plug can be screwed into it. In the operating state, the spark plug is screwed into the water sleeve. At least a portion of the external thread of the water sleeve encloses the heat conducting section of the spark plug.

The present design may have important advantages:

The groove in the body can be produced very easily, for example by milling, before placement of the sleeve thereon. The groove in the body is open toward the outside and only becomes a supply passage with a circumferentially closed wall through placement of the sleeve thereon.

The heat conducting section of the sleeve ensures very good heat transfer from the body of the spark plug to the water sleeve. As a result of the external thread of the water sleeve surrounding the heat conducting section of the sleeve, the heat transfer is continued very well to the cylinder head of the internal combustion engine and the coolant circulating therein. Excessive heating of the combustion chamber end of the insulator and/or an insulator nose as well as the center electrode can be prevented. The risk that the fuel/air mixture ignites prematurely at hot surfaces of the spark plug, especially at surfaces of the insulator and/or center electrode, is reduced.

The heat conducting section of the sleeve surrounds the end of the body at the combustion chamber side or pre-chamber side. As a result, the insulator can be inserted into the body in a customary and proven manner and sealed therein. The production of the spark plug is further simplified by keeping the joining method that has been proven in practice.

The supply passages in the spark plug do not impair the seal between insulator and body either during production or in operation.

In a further embodiment, the body can have a sealing seat for the insulator within the heat conducting section of the sleeve. The heat conducting section of the sleeve can be in contact over the entire circumference with a groove-free section of the body, which in particular can be located at the pre-chamber end of the body. This can further improve heat dissipation from the insulator to the external thread of the spark plug. A good heat-conducting contact between the outside of the body and the inside of the sleeve can be produced through a press fit between sleeve and body.

The supply passage can be formed between its discharge opening and the groove by a through hole located in the body. The through hole can extend from the outside of the body, in particular from the groove, to an inner side of the body that in particular has the shape of a circular cylinder. There, it can open into the pre-chamber. The through hole can have a diameter of at most 0.2 mm. The length of the through hole can be more than 2.5 mm, in particular more than 3 mm. This can prevent the combustion occurring in the pre-chamber from propagating into the supply passage. Due to the extremely small diameter of the through hole, a flame entering the supply passage is immediately extinguished. The through hole can extend in a straight line through the body. This can facilitate the production of the through hole, for example by drilling or electric discharge machining. The through hole can extend through the body at an angle to the longitudinal direction of the spark plug. The discharge opening of the supply passage can be located such that the enrichment fuel can be supplied in the direction toward the spark air gap. The discharge opening of the supply passage can be located in the pre-chamber, in particular closer to the front end of the spark plug than the pre-chamber end of the insulator. Depending on the quantity of enrichment fuel required, multiple longitudinal grooves can also be provided on the outside of the body, with a through hole leading from each of them into the pre-chamber. On the outside of the body can be located a groove extending around its circumference that is likewise covered by the heat conducting section of the sleeve and from which multiple through holes extend, each to a discharge opening. Because of the groove extending in the circumferential direction of the body, the number of longitudinal grooves can be chosen independently of the number of through holes.

In a further embodiment, the body can be surrounded at its outside by a seal extending in the circumferential direction that seals the spark plug to a component of the internal combustion engine, in particular to the water sleeve, once it has been screwed in. The sleeve can work together with a wall of the water sleeve for this purpose. At least one inlet opening of the supply passage is located on the outside of the spark plug. The inlet opening of the supply passage can be a shorter distance from the front end of the spark plug than the seal.

The inlet opening of the supply passage can be located in the sleeve. A through hole can extend through the sleeve from the inlet opening of the supply passage to the groove, in particular the longitudinal groove, in the body. On its outside, the sleeve can have a seal extending in the circumferential direction. The inlet opening of the supply passage can be located between the seal of the sleeve and the seal of the body. This can guarantee good sealing of the supply passage.

In the embodiment of the system comprising water sleeve and spark plug, provision can be made that the water sleeve has a wall that surrounds the seal located on the body, and that rests against it in a sealing manner. The wall of the water sleeve can surround the inlet opening of the supply passage of the spark plug. The wall can have on its inside a discharge opening of a supply passage for enrichment fuel that is located closer to the front end of the spark plug than the seal surrounding the body of the spark plug. This can guarantee well-sealed supply of enrichment fuel to the spark plug.

In a further embodiment, provision can be made that the sleeve completely covers the groove. The sleeve can have a collar on its outside. The collar can be welded to the body, in particular with a weld seam extending in the circumferential direction. The collar can contain the inlet opening of the supply passage. The collar can also contain the seal that surrounds the sleeve. A reliable and permanent connection between the sleeve and the body can be ensured by means of the collar welded onto the body. Furthermore, a tightening torque can be transmitted reliably from the body to the external thread located on the sleeve.

DRAWINGS

Additional advantages and features are evident from the description below of some exemplary embodiments in conjunction with the figures. They show.

DESCRIPTION

FIGS. 1 to 4 each show a system with a water sleeve 1 and a spark plug 2. The water sleeve 1 is arranged in a manner that is known per se in a cylinder head, not shown, of an internal combustion engine, and has coolant of the internal combustion engine flowing around its outside. The internal combustion engine is operated with gas, for example natural gas, and can in particular be a stationary gas engine. The spark plug 2 is screwed into the water sleeve 1. To this end, the spark plug 2 has an external thread 4 at its front end 3.

The spark plug 2 contains a center conductor 5, an insulator 6, a metallic body 7, a center electrode 8 and a ground electrode 9. The center conductor 5 can include an igniter that is attached to the center electrode 8 by an electrically conductive fused glass element 10. The ground electrode 9 is welded to the body 7 and forms a spark air gap 11 together with the center electrode 8. Both the center electrode 8 and the ground electrode 9 can be reinforced at the surfaces delimiting the spark air gap 11 with precious metal components in a manner that is known per se. The body 7 has a passage with a sealing seat 12 for the insulator 6. The sealing seat 12 is formed by a narrowing in the passage of the body 7. At the seal seat 12, the insulator 6 is sealed with respect to the body 7 by the interposition of a seal ring 14. For pressure-tight attachment of the insulator 6 in the passage of the body 7, the body 7 has a flange 16 and a shrinkage groove 17. An attachment of the insulator 6 in the body 7 of this nature is known per se and has been well-proven in practice.

Figure 1:
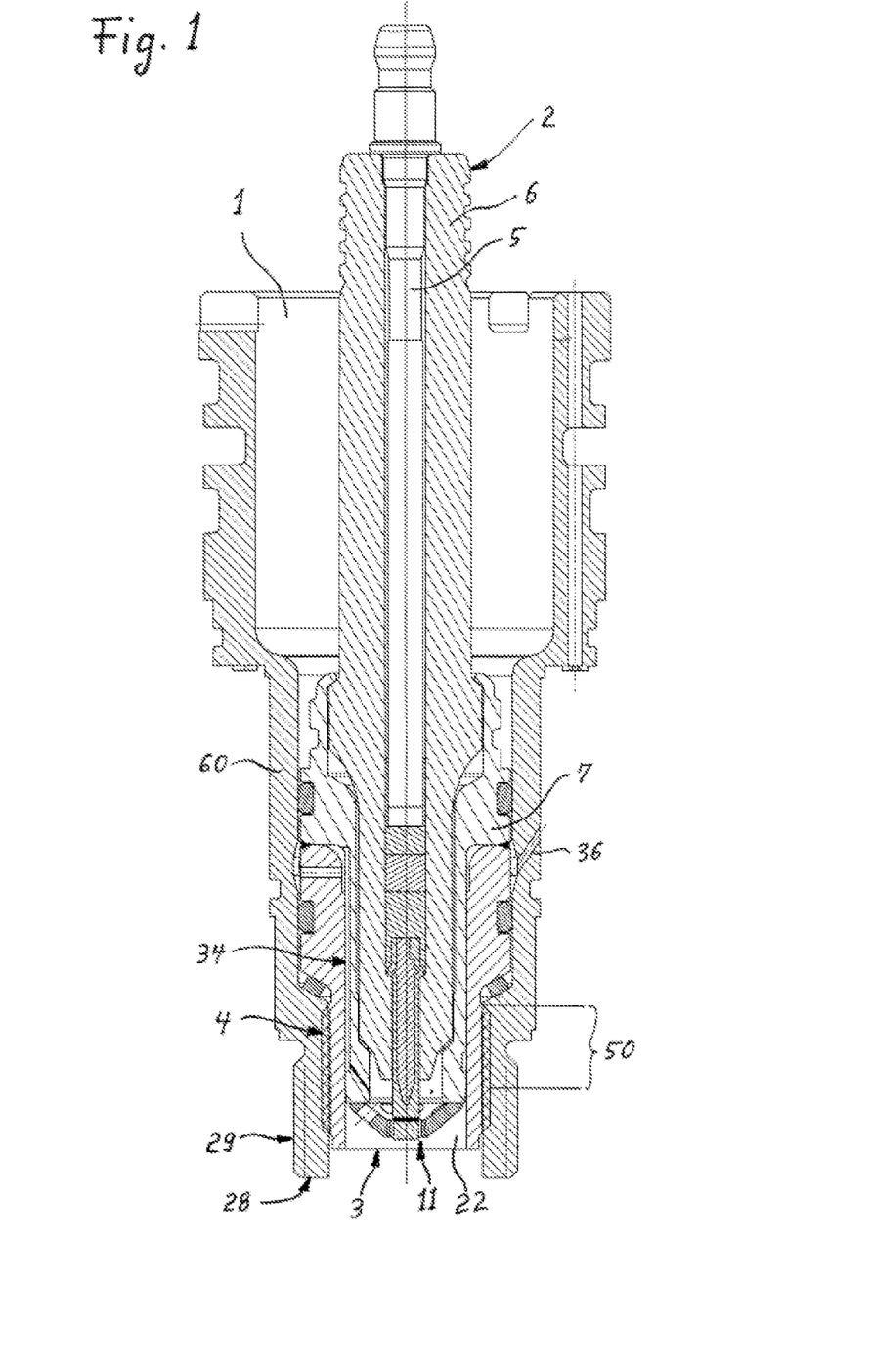
FIG. 1 a first embodiment of a system comprising spark plug and water sleeve in longitudinal section, FIG. 2 a second embodiment of a system in longitudinal section, FIG. 3 a third embodiment of a system in longitudinal section, and FIG. 4 an enlarged detail from FIGS. 1 to 3.
Figure 2:
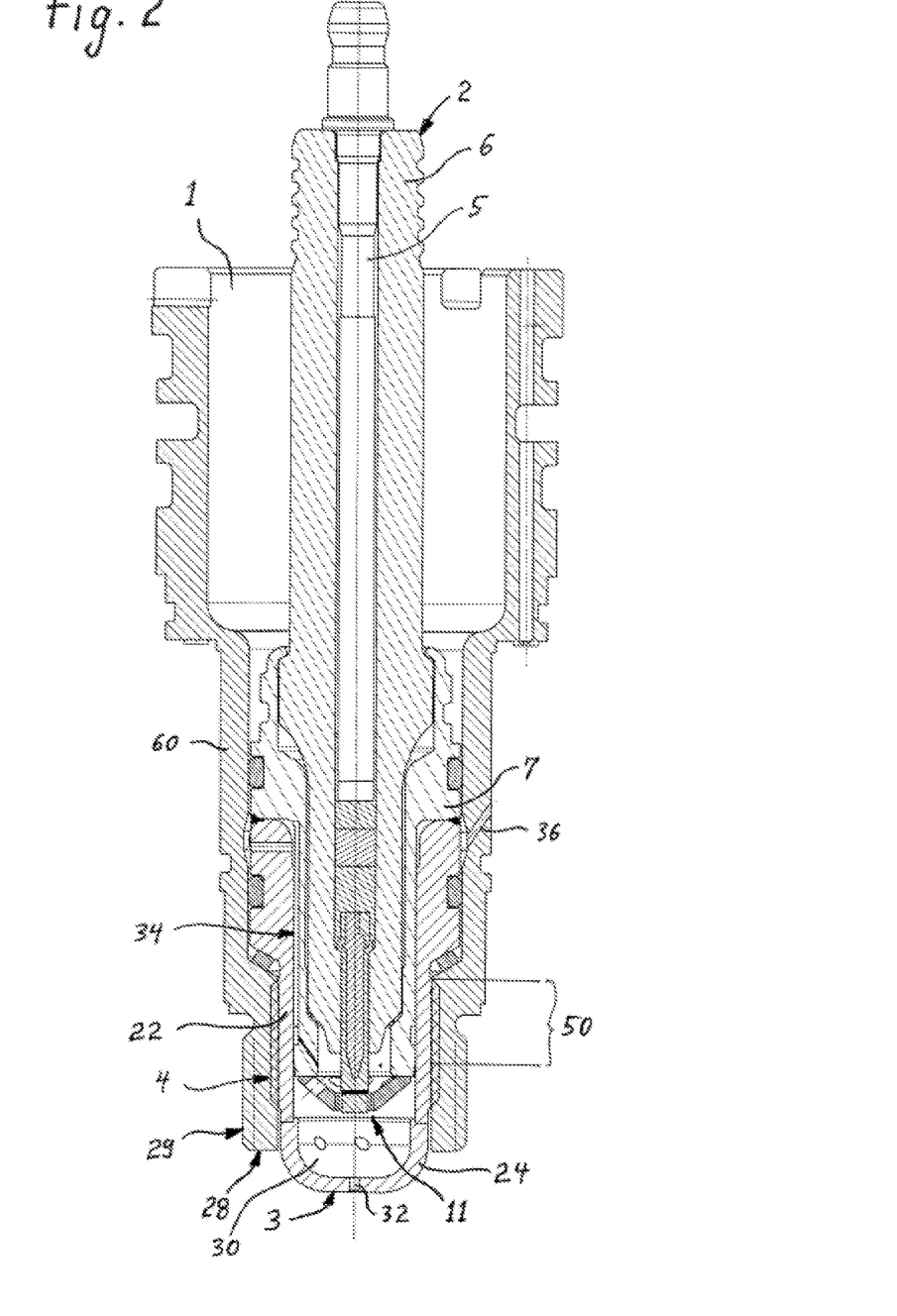

Toward the front end 3, the body 7 has a circular-cylinder-shaped section 20 onto which a sleeve 22 is attached by means of a press fit. The circular-cylinder-shaped section 20 has, at its front end, a chamfer 21 that guides the sleeve 22 when it is being pressed on. The sleeve 22 contains the external thread 4 as well as a collar 26 and is welded to the body 7 by means of a weld seam 25. In the exemplary embodiment from FIG. 2, the sleeve 22 further includes a cap 24. In the embodiment shown in FIG. 2, a sleeve section containing the external thread 4 and a sleeve section containing the cap 24 are produced as individual parts and are then welded to one another. Alternatively, the sleeve 22 can also be produced as a single piece with the cap 24 in a manner that is not shown. The water sleeve 1 includes, at its front end 28, an external thread 29 with which it can be screwed into the cylinder head, which is not shown. In the embodiment shown in FIG. 3, a cap 27 is located at the front end 28 of the water sleeve 1. Each of the caps 24, 27 delimits a pre-chamber 30 in which the spark air gap 11 is located. The cap 24, 27 shields the spark air gap 11 from a combustion chamber, not shown, of the internal combustion engine. The cap 24, 27 has multiple openings 32 that permit gas exchange between the pre-chamber 30 and the combustion chamber. FIG. 1 thus shows a system according to the invention comprising water sleeve 1 and spark plug 2 that is designed with no pre-chamber. FIG. 2 shows a pre-chamber spark plug. Aside from the caps 24 and 27 delimiting the pre-chambers 30, the water sleeves 1 and spark plugs 2 from FIGS. 1 to 3 are identical in design, specifically in the region shown enlarged in FIG. 4.

Figure 3:
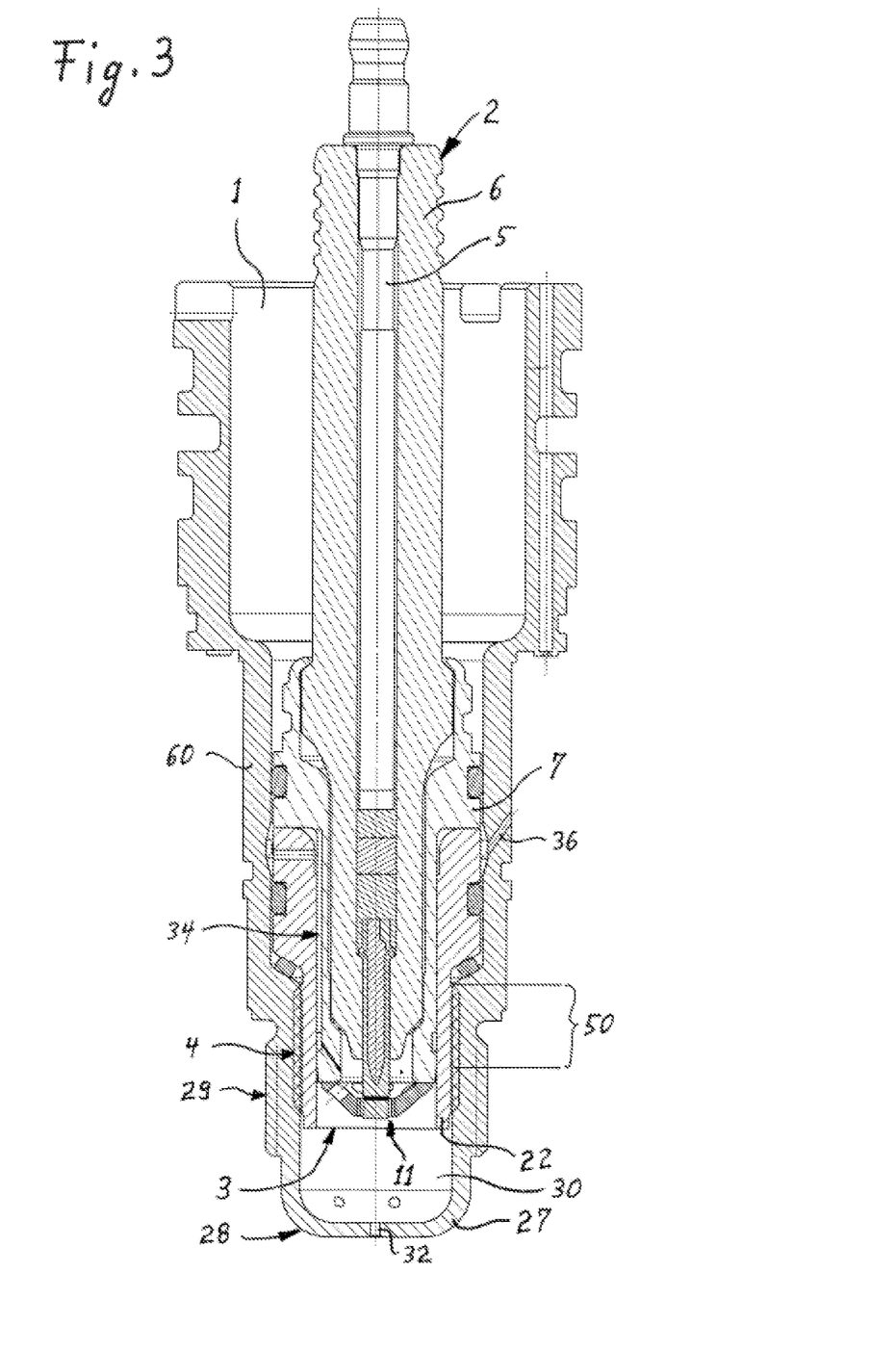
Figure 4:
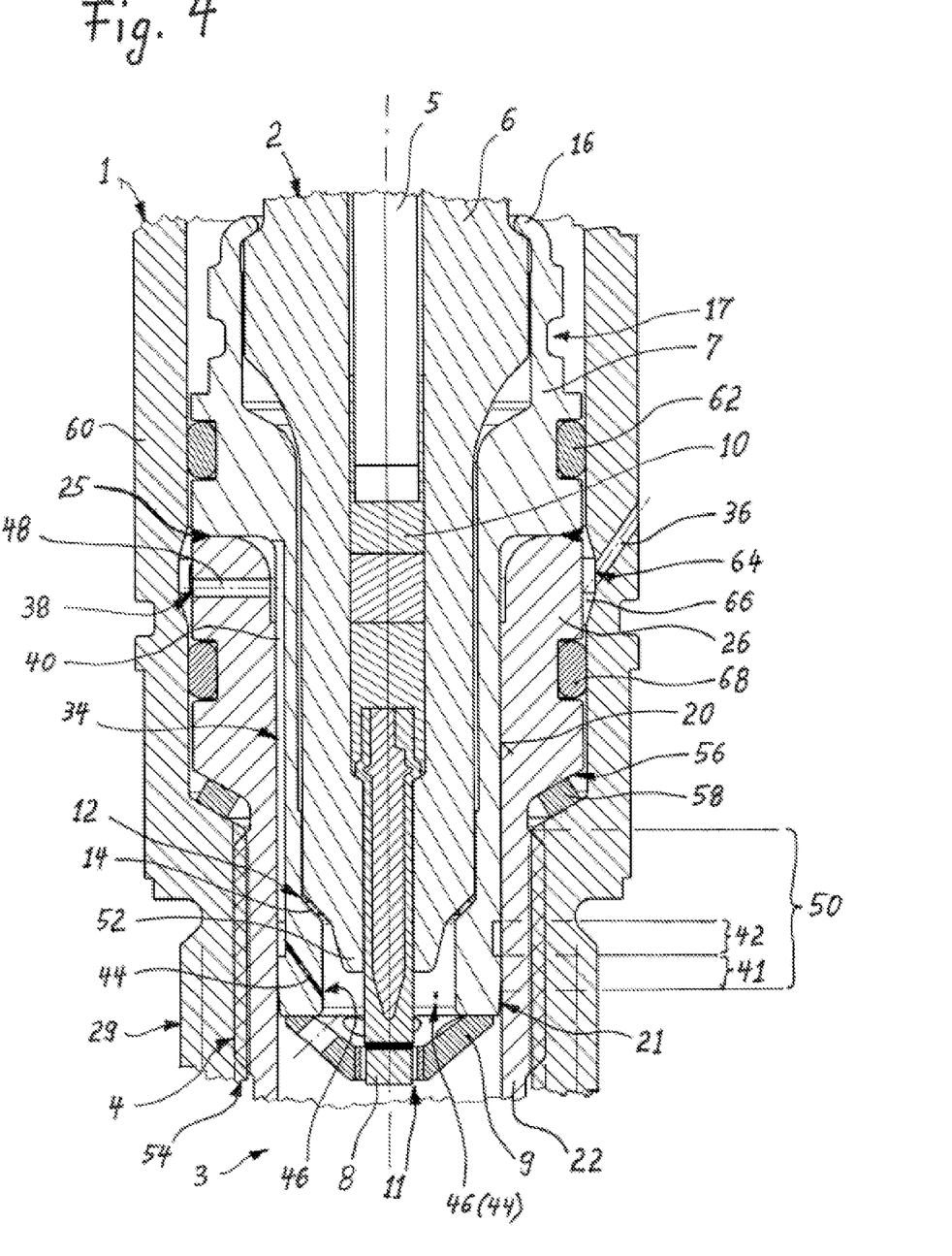

A region of the spark plug 2 containing the spark air gap 11, as well as the pre-chamber 30 that may also be present, see FIGS. 2 and 3, can be flushed with enrichment gas in order to improve the ignition behavior of the internal combustion engine in lean-burn operation. To this end, the spark plug 2 contains a supply passage 34, which in particular opens into the pre-chamber 30. Outside the water sleeve 1, the internal combustion engine has a feed device (not shown) for enrichment fuel from which the enrichment fuel is routed through a supply passage 36 in the water sleeve 1 to the spark plug 2. An inlet opening 38 of the supply passage 34 is located on the collar 26. Before the sleeve 22 is mounted on the body 7, a longitudinal groove 40 is milled in the cylindrical section 20 of the body 7. A groove-free section 41 remains at the front end of the body 7. Located adjacent to the section 41 is a circumferential groove 42 surrounding the body 7. The body 7 further has multiple through holes 44 distributed along its circumference that form sections of the supply passage 34 between the circumferential groove 42 and the discharge openings 46 of the supply passage 34. The sleeve 22 has a cylindrical inner contour, and once it is pressed onto the cylindrical section 20 of the body 7, it covers the grooves 40 and 42. In this way, the grooves 40 and 42 become sections of the supply passage 34. Between the inlet opening 38 and the longitudinal groove 40, the supply passage 34 is formed by a through hole 48 in the sleeve 22. The supply passage 34 of the spark plug 2 thus includes the interconnected sections 48, 40, 42 and 44 between its inlet opening 38 and its discharge openings 46. As a result of the two very short, straight through holes 44 and 48 and the grooves 40 and 42, the supply passage 34 can be produced in the spark plug 2 in a very simple manner.

The sleeve 22 has a heat conducting section 50. The heat conducting section 50 is in good thermally conductive contact with the body 7, namely through the press fit on the circular-cylinder-shaped section 20. The external thread 4 extends over the entire heat conducting section 50. The heat conducting section 50 covers the groove-free section 41, the circumferential groove 42, and part of the longitudinal groove 40. An especially good thermally conductive contact between the sleeve 22 and the body 7 is present in the groove-free section 41 along the entire circumference. In the other regions of the heat conducting section 50, the contact between the body 7 and the sleeve 22 is interrupted only to a small degree by the grooves 40 and 42. The heat conducting section 50 surrounds the sealing seat 12. The heat that is generated by the ignition spark and subsequent combustion and that is introduced into the center electrode 8 and the ground electrode 9 can be removed very well through the heat conducting section 50 to the cooled water sleeve 1. The heat that is introduced into the ground electrode 9 is conducted through the groove-free section 41 of the body 7 to the heat conducting section 50. The heat that is introduced into the center electrode 8 and an insulator nose 52 that surrounds it is conducted through the sealing seat 12 of the insulator 6 to the body 7 and is then conducted through the circular-cylinder-shaped section 20 to the heat conducting section 50. The spark plug 2 sits with its external thread 4 in a corresponding internal thread 54 of the water sleeve 1. The internal thread 54 is coaxial with the external thread 29. A part of the external thread 29 of the water sleeve 1 surrounds the heat conducting section 50. This can improve heat dissipation from the water sleeve 1 to the cylinder head, which is not shown.

Between the external thread 4 and the collar 26, the sleeve 22 has a circumferential shoulder 56. Located between the shoulder 56 and a suitably adapted inside contour of the water sleeve 1 is a seal ring 58 that seals the spark plug 2 to the water sleeve 1.

The water sleeve 1 has a wall 60. The body 7 is surrounded on its outside by a seal 62, which extends in the circumferential direction and seals the spark plug 2 with respect to the wall 60. The inlet opening 38 of the supply passage 34 is located closer than the seal 62 to the front end 3 of the spark plug 2. The wall 60 contains the supply passage 36 and has on its inside a discharge opening 64 of the supply passage 36. The discharge opening 64 is located closer than the seal 62 to the front end 3 of the spark plug 2. The discharge opening 64 and the inlet opening 38 are located at approximately equal distances from the front end 3 of the spark plug 2. In the region of the discharge opening 64, the inside of the wall 60 can have a widening 66 extending along the entire circumference of the water sleeve 1 that can improve the supply of enrichment gas from the discharge opening 64 to the inlet opening 38. The seal 62 rests against the inside of the wall 60 in a sealing manner. In this way, unintended escape of enrichment gas from the intermediate space between the water sleeve 1 and the spark plug 2 can be prevented. Moreover, an additional seal 68 can be provided that extends along the outside of the sleeve 22 in the circumferential direction. The seal 68 is a shorter distance from the front end 3 of the spark plug 2 than the inlet opening 38 is. The seal 68 likewise rests against the inside of the wall 60 of the water sleeve 1 in a sealing manner. This can further improve the sealing of the spark plug 2 in the water sleeve 1.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

| | |
|---|---|
| 1 | water sleeve |
| 2 | spark plug |
| 3 | front end |
| 4 | external thread |
| 5 | center conductor |
| 6 | insulator |
| 7 | body |
| 8 | center electrode |
| 9 | ground electrode |
| 10 | fused glass element |
| 11 | spark air gap |
| 12 | sealing seat |
| 14 | seal ring |
| 16 | flange |
| 17 | shrinkage groove |
| 20 | circular-cylinder-shaped section |
| 21 | chamfer |
| 22 | sleeve |
| 24 | cap |
| 25 | weld seam |
| 26 | collar |
| 27 | cap |
| 28 | front end |
| 29 | external thread |
| 30 | pre-chamber |
| 32 | opening |
| 34 | supply passage |
| 36 | supply passage |
| 38 | inlet opening |
| 40 | longitudinal groove |
| 41 | groove-free section |
| 42 | circumferential groove |
| 44 | through hole |

-continued

LIST OF REFERENCE NUMERALS

| | |
|---|---|
| 46 | discharge opening |
| 48 | through hole |
| 50 | heat conducting section |
| 52 | insulator nose |
| 54 | internal thread |
| 56 | shoulder |
| 58 | seal ring |
| 60 | wall |
| 62 | seal |
| 64 | discharge opening |
| 66 | circumferential widening |
| 68 | seal |

The invention claimed is:

1. A spark plug for an internal combustion engine, having the following features:
   a supply passage, a center conductor, an insulator surrounding the center conductor, and a metallic body surrounding the insulator;
   a center electrode connected in an electrically conductive manner to the center conductor and at least one ground electrode connected in an electrically conductive manner to the body form a spark air gap;
   in a region of its front end, the spark plug has an external thread for screwing the spark plug into a component of the internal combustion engine and has at least one discharge opening of the supply passage;
   wherein, at its front end, the spark plug has, attached to the body, a sleeve that contains the external thread,
   the body has, on its outside, at least one groove that forms a section of the supply passage, and
   the sleeve has a heat conducting section that contains at least a part of the external thread and that is in contact with the body and covers at least portions of the groove.

2. The spark plug according to claim 1, wherein the body has a sealing seat for the insulator within the heat conducting section of the sleeve.

3. The spark plug according to claim 1, wherein the heat conducting section of the sleeve is in contact over an entire circumference with a groove-free section of the body.

4. The spark plug according to claim 1, wherein the supply passage is formed between its discharge opening and the groove by a through hole, in particular extending in a straight line, located in the body.

5. The spark plug according to claim 4, wherein the body has, on its outside, at least one longitudinal groove and a circumferential groove that form sections of the supply passage, wherein multiple through holes each lead from the circumferential groove to a discharge opening.

6. The spark plug according to claim 1, wherein the body is surrounded on its outside by a seal extending in the circumferential direction in order to seal the spark plug with respect to a component of the internal combustion engine.

7. The spark plug according to claim 6, wherein the spark plug further has, located on the outside, at least one inlet opening of the supply passage that is located closer than the seal to the front end of the spark plug.

8. The spark plug according to claim 1, wherein the sleeve completely covers the groove.

9. The spark plug according to claim 1, wherein the sleeve has a collar that is welded to the body.

10. The spark plug according to claim 1, wherein:
    the sleeve contains a cap that is arranged at the front end of the spark plug and that shields the spark air gap from a combustion chamber of the internal combustion engine after the spark plug is installed in a component of the internal combustion engine and that delimits a pre-chamber in which the spark air gap is located; and the cap has at least one opening that permits gas exchange between the pre-chamber and the space outside of the pre-chamber.

11. A system containing a water sleeve that has an external thread for screwing the water sleeve into an internal combustion engine and that has an internal thread into which a spark plug according to claim 1 is screwed, wherein at least a portion of the external thread of the water sleeve encloses the heat conducting section of the spark plug.

12. The system according to claim 11, wherein:

the body is surrounded on its outside by a seal extending in the circumferential direction in order to seal the spark plug with respect to a component of the internal combustion engine;

the spark plug further has, located on the outside, at least one inlet opening of the supply passage that is located closer than the seal to the front end of the spark plug;

the water sleeve has a wall that surrounds the seal of the spark plug and rests thereon in a sealing manner;

the wall of the water sleeve surrounds the inlet opening of the supply passage of the spark plug;

the wall of the water sleeve has, on its inside, a discharge opening of a supply passage for fuel; and the discharge opening in the wall of the water sleeve is located closer to the front end of the spark plug than the seal.

\* \* \* \* \*